UNITED STATES PATENT OFFICE.

FELIX RICHTER, OF FRANKFORT-ON-THE-MAIN, GERMANY.

PROCESS FOR MANUFACTURING COAL OF HIGH ACTIVITY.

1,001,222.

Specification of Letters Patent. Patented Aug. 22, 1911.

No Drawing.   Application filed March 27, 1911.   Serial No. 617,112.

*To all whom it may concern:*

Be it known that I, FELIX RICHTER, a citizen of the German Empire, residing at Frankfort-on-the-Main, Germany, have invented certain new and useful Improvements in Processes for Manufacturing Coal of High Activity, of which the following is a specification.

My invention relates to a process of manufacturing a highly active carbon for use in the clarification of liquids, and has for its object to produce such active carbon from materials which have in their use become coated with carbonizable substances such as organic matter. Thus, finely divided substances such as absorbent carbon, spongy iron, or china clay are used in the shape of powder or lumps to free liquids from undesirable or injurious organic substances contained therein in pseudo-solutions. For example, water containing both iron oxid and organic substance, which cannot, as proved by experience, be clarified by ordinary methods for removing the iron by ordinary methods for removing the iron oxid, can be satisfactorily clarified by subjecting it to the surface action of active carbon in shaking, sprinkling or other mechanical devices. In the same way, it is possible to separate the numerous colloidal substances dissolved in drain water, by means of carbon or certain roasted iron ores, to such a complete extent that the purified water remains permanently colorless, clear, odorless and incapable of putrefying; so also the waste water from dye works, paint factories, breweries, starch factories, tanning works and dairies, can be similarly clarified to such an extent that it can be safely discharged into any stream. In all these cases the substance used as an absorbent is gradually coated with carbon-containing organic substances such as albumen and other nitrogen compounds, humous substances, colloidal carbo-hydrates and other mucous substances, which, when coked, form an extremely useful variety of active carbon.

According to my invention, I take the particles of absorbent materials, on which the above-mentioned impurities have been deposited to such an extent that the absorbent particles are no longer effective, compress the slimy mass and then subject such compressed mass to dry distillation.

The temperature must be regulated so that the particles of the original absorbent do not become fritted, or still less melted together, but are merely coated with a fine layer of carbon produced by the organic substances. In this way, there is imparted to the material increased absorbent activity, as the surface of the clarifying substance as originally used is already absorbent, and is now, in addition, coated with a valuable active substance.

The clarifying materials used for separating out the impurities form the liquids by surface attraction must be of such character that the particles do not frit together when heated to the temperature required for dry distillation, since the attracting or clarifying qualities of said substances depend on the surface action of small solid grains of a substantially pulverulent material.

A suitable clarifying material which may be used in connection with the process of this invention is carbon which has been manufactured by dry distillation, with exclusion of air, from a mixture of carbonaceous material, such as finely divided natural carbon, and finely divided clay. The process described may be repeated several times.

What I claim is:

1. The process of manufacturing carbon of high activity, consisting in subjecting to dry distillation finely-divided clarifying substances, in solid condition and of such property that the same do not frit together when heated to temperatures required for the dry distillation of carbonaceous material, which substances have become charged with organic matter by use in clarification, so that said organic matter is transformed into active carbon.

2. The process of manufacturing carbon of high activity, consisting in subjecting to dry distillation carbon in finely-divided condition, containing mineral matter of such property that it does not frit together when heated to temperatures required for the dry distillation of carbonaceous material, which carbon has become charged with organic matter by use in clarification, so as to transform said organic matter into active carbon.

In testimony whereof, I affix my signature in presence of two witnesses.

FELIX RICHTER.

Witnesses:
  JEAN GRUND,
  CARL GRUND.